United States Patent
Zhang et al.

(10) Patent No.: US 12,505,556 B2
(45) Date of Patent: Dec. 23, 2025

(54) CORNER POINT DETECTION METHOD AND APPARATUS

(71) Applicant: CONTEMPORARY AMPEREX TECHNOLOGY (HONG KONG) LIMITED, Hong Kong (CN)

(72) Inventors: Lei Zhang, Ningde (CN); Guannan Jiang, Ningde (CN); Fei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 309 days.

(21) Appl. No.: 18/359,086

(22) Filed: Jul. 26, 2023

(65) Prior Publication Data

US 2024/0020846 A1    Jan. 18, 2024

Related U.S. Application Data

(63) Continuation of application No. PCT/CN2023/081107, filed on Mar. 13, 2023.

(30) Foreign Application Priority Data

Jul. 18, 2022    (CN) .......................... 202210841619.X

(51) Int. Cl.
*G06T 7/13*    (2017.01)
*G06T 7/00*    (2017.01)
(Continued)

(52) U.S. Cl.
CPC .............. *G06T 7/13* (2017.01); *G06T 7/0004* (2013.01); *G06T 7/136* (2017.01); *G06V 10/44* (2022.01);
(Continued)

(58) Field of Classification Search
CPC ......... G06T 7/13; G06T 7/0004; G06T 7/136; G06T 2207/20164; G06T 2207/30164; G06V 10/44
See application file for complete search history.

(56) References Cited

U.S. PATENT DOCUMENTS

| | | |
|---|---|---|
| 2015/0104106 A1 | 4/2015 | Elinas et al. |
| 2015/0178593 A1 | 6/2015 | Shen et al. |

(Continued)

FOREIGN PATENT DOCUMENTS

| | | | |
|---|---|---|---|
| CN | 103927750 A | 7/2014 | |
| CN | 107341802 A * | 11/2017 | ........... G06T 7/0004 |

(Continued)

OTHER PUBLICATIONS

ISR for International Application PCT/CN2023/081107 dated May 10, 2023.
(Continued)

*Primary Examiner* — Casey L Kretzer
(74) *Attorney, Agent, or Firm* — Ladas & Parry, LLP

(57) ABSTRACT

A corner point detection method and apparatus, which may improve the efficiency of corner point detection is disclosed. The corner point detection method includes: obtaining a plurality of corner points of a target object in an image to be detected, where the plurality of corner points are corner points on a contour of a first object in the image to be detected, and the contour of the first object includes a contour of the target object; obtaining a region proportion corresponding to each of the plurality of corner points, where the region proportion is a proportion of a region of the first object in a predetermined region centered on the corner point; and determining a target corner point of the target object from the plurality of corner points based on the region proportion.

12 Claims, 4 Drawing Sheets

(51) Int. Cl.
*G06T 7/136* (2017.01)
*G06V 10/44* (2022.01)

(52) U.S. Cl.
CPC ............... *G06T 2207/20164* (2013.01); *G06T 2207/30164* (2013.01)

(56) References Cited

U.S. PATENT DOCUMENTS

| | | | | |
|---|---|---|---|---|
| 2020/0134682 A1* | 4/2020 | Sethi | ....................... | G06F 16/51 |
| 2023/0184690 A1* | 6/2023 | Kim | .................... | H01M 50/531 382/141 |

FOREIGN PATENT DOCUMENTS

| | | |
|---|---|---|
| CN | 107816951 A | 3/2018 |
| CN | 107833217 A | 3/2018 |
| CN | 108229433 A | 6/2018 |
| CN | 108875723 A | 11/2018 |
| CN | 108898147 A | 11/2018 |
| CN | 109409366 A | 3/2019 |
| CN | 109509200 A | 3/2019 |
| CN | 110569857 A | 12/2019 |
| CN | 110992326 A | 4/2020 |
| CN | 111047614 A | 4/2020 |
| CN | 111681284 A | 9/2020 |
| CN | 111832659 A | 10/2020 |
| CN | 111986219 A | 11/2020 |
| CN | 112528847 A | 3/2021 |
| CN | 112669365 A | 4/2021 |
| CN | 113409334 A | 9/2021 |
| CN | 113888456 A | 1/2022 |
| CN | 113920324 A | 1/2022 |
| CN | 114445499 A | 5/2022 |
| WO | 2022148192 A1 | 7/2022 |

OTHER PUBLICATIONS

Written Opinion for International Application PCT/CN2023/081107 dated May 10, 2023.
Chinese Office Action for counterpart application CN-202210841619.X dated Jun. 14, 2023.
Li Houjie et al.: "Separation Algorithm of Traffic Signs Based on Curvature Scale Space Corner Detection" Acta Optica Sinica vol. 35, No. 1, Jan. 2015(Jan. 1, 2015).
China Second Office Action for Application No. 202210841619.X, dated Apr. 25, 2024, 9 pages.
Extended European Search Report for Application No. PCT/CN2023081107, dated Jul. 2, 2024, 6 pages.
G. Guo et al., "Automatic Video Text Localization and Recognition," Fourth International Conference on Image and Graphics (ICIG 2007), Chengdu, China, Aug. 1, 2007, pp. 484-489.

\* cited by examiner

CORNER POINT DETECTION METHOD AND APPARATUS

CROSS-REFERENCE TO RELATED APPLICATION

The present application is a continuation of International application PCT/CN2023/081107 filed on Mar. 13, 2023 that claims the priority of Chinese patent application no. 202210841619.X, filed on Jul. 18, 2022. The content of these applications, is incorporated herein by reference in its entirety.

TECHNICAL FIELD

The present application relates to the field of image processing technologies, and more specifically, to a corner point detection method and apparatus.

BACKGROUND ART

A corner point in an image is generally a point at which the luminance changes drastically in the image, or a point on an edge contour curve at which the curvature reaches its maximum in the image, and is an important feature characterizing the image. Since image corner point detection is an important part of processes such as automatic detection of workpieces in an industrial site, the corner point extraction capability and speed thereof may directly affect the precision and efficiency of industrial automation detection.

At this stage, corner point detection algorithms are mainly categorized into a greyscale image-based corner point detection algorithm, a binary image-based corner point detection algorithm, and a contour curve-based corner point detection algorithm. A contour-based corner point detection method has been more widely applied due to its low error rate of detection. However, the existing contour-based corner point detection method has high computational complexity, and is not applicable to detection scenarios that require high efficiency. Therefore, there is an urgent need for an efficient corner point detection method.

SUMMARY OF THE INVENTION

Embodiments of the present application provide a corner point detection method and apparatus, which may reduce the algorithm complexity, thereby improve the efficiency of corner point detection.

According to a first aspect, there is provided a corner point detection method, including: obtaining a plurality of corner points of a target object in an image to be detected, where the plurality of corner points are corner points on a contour of a first object in the image to be detected, and the contour of the first object includes a contour of the target object; obtaining a region proportion corresponding to each of the plurality of corner points, where the region proportion is a proportion of a region of the first object in a predetermined region centered on the corner point; and determining a target corner point of the target object from the plurality of corner points based on the region proportion.

In the technical solution of the present application, whether a corner point is a target corner point may be determined based only on the region proportion, and no other corner points are required for assisting in the determining. Compared with the existing methods, the technical solution of the present application reduces the number of traversals and the algorithm complexity, and improves the efficiency of corner point detection.

In some possible implementations, the determining a target corner point of the target object from the plurality of corner points based on the region proportion includes: obtaining at least one candidate corner point whose region proportion being greater than a predetermined value from the plurality of corner points; and obtaining the target corner point from the at least one candidate corner point.

Interference points are filtered out in a numerical comparison manner of comparing the region proportion with the predetermined value, to obtain the qualified candidate corner points, which is conducive to determining the target corner point as fast as possible. Therefore, the efficiency of corner point detection is improved.

In some possible implementations, the obtaining the target corner point from the at least one candidate corner point includes: if there are a plurality of candidate corner points, determining the target corner point based on a location relationship between each of the plurality of candidate corner points and a center point of the target object.

Since the location relationship between each candidate corner point and the center point of the target object varies, the target corner point may be determined from the plurality of candidate corner points based on the location relationship in one step. Therefore, the efficiency of corner point detection is improved.

In some possible implementations, the determining the target corner point based on a location relationship between each of the plurality of candidate corner points and a center point of the target object includes: determining, as the target corner point, a candidate corner point of the plurality of candidate corner points that is at a maximum vertical distance from a location of the center point of the target object.

In some possible implementations, the obtaining a plurality of corner points of a target object in an image to be detected includes: obtaining the plurality of corner points in a region of interest in the image to be detected.

Setting the region of interest in the image to be detected may reduce a range of the image to be detected that requires analysis and processing, and reduce the number of corner points to be obtained for subsequent processing. Therefore, the efficiency of corner point detection is improved.

In some possible implementations, the method further includes: determining at least one region of interest in the image to be detected.

In the image to be detected, a plurality of regions of interest may be set so as to obtain corner points. If the number of corner points on the contour of the first object is large, the number of corner points to be obtained may be further reduced by setting a plurality of regions of interest, to further reduce the number of traversals and the amount of computation, and thus improve the efficiency of corner point detection.

In some possible implementations, the obtaining a plurality of corner points of a target object in an image to be detected includes: obtaining the contour of the first object in the region of interest to obtain a target contour, where the target contour includes the contour of the target object; and obtaining corner points on the target contour to obtain the plurality of corner points.

The contour of the target object is cut out of the contour of the first object by using the region of interest, to obtain the contour including the target object, and the corner points on the contour including the target object are obtained, which reduces the number of corner points to be obtained, and thus improves the efficiency of corner point detection, compared to first obtaining all corner points on the contour of the first object and then obtaining corner points on the contour including the target object by using the region of interest.

In some possible implementations, the obtaining corner points on the target contour to obtain the plurality of corner points includes: obtaining a polygon corresponding to the target contour by using a polygon approximation method; and obtaining vertices of the polygon to obtain the plurality of corner points.

Obtaining the polygon corresponding to the target contour by using the polygon approximation method may reduce corner points that need to be subsequently processed, and thus improve the efficiency of corner point detection.

In some possible implementations, before obtaining the contour of the first object in the region of interest, the method further includes: performing binarization on the image to be detected, to obtain a binary image of the image to be detected; and obtaining the contour of the first object based on an edge of the binary image.

After the binarization processing is performed on the image to be detected, the image may appear in distinctly black and white, so that the contour of the first object is highlighted, and then may be quickly extracted from the edge of the binary image.

In some possible implementations, the predetermined region is in the shape of a circle.

Setting the predetermined region to be in the shape of a circle facilitates quick determining of the region proportion of the region of the first object in the predetermined region. In addition, there is no need to consider an impact of angles on the region proportion, which needs to be considered for other angled images. Therefore, the accuracy of corner point detection is improved.

In some possible implementations, a radius of the circle is ten pixels.

Setting the radius of the circular predetermined region to be ten pixels may avoid the problem that if the radius is excessively large, other corner points may be included in the predetermined region, which affects calculation of a region proportion of a current corner point; or if the radius is excessively small, the precision will be relatively low. Setting the value may help calculate the region proportion more properly and effectively, so as to improve the accuracy of the corner point detection.

In some possible implementations, the predetermined value is 0.6.

Setting the predetermined value to be 0.6 may exclude corner points on an approximate line, which facilitates quick obtaining of the target corner point, thereby improving the efficiency of corner point detection.

In some possible implementations, the target object is a tab.

According to a second aspect, there is provided a corner point detection apparatus, including a processor and a memory, where the memory is configured to store a program, and the processor is configured to invoke the program from the memory and execute the program to perform the corner point detection method in the first aspect or any possible implementations of the first aspect.

According to a third aspect, there is provided a computer-readable storage medium, including a computer program that, when executed on a computer, causes the computer to perform a corner point detection method in the first aspect or any possible implementation of the first aspect.

According to a fourth aspect, there is provided a computer program product including instructions that, when executed by a computer, causes the computer to perform the corner point detection method in the first aspect or any possible implementations of the first aspect.

BRIEF DESCRIPTION OF THE DRAWINGS

In order to illustrate the technical solutions of the embodiments of the present application more clearly, the accompanying drawings required in the description of the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

DETAILED DESCRIPTION

Figure 1:
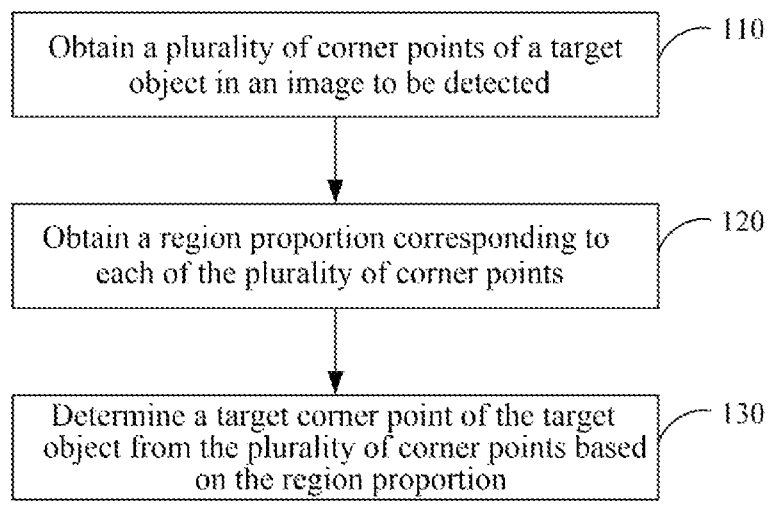
FIG. 1 is a schematic flowchart of a corner point detection method according to an embodiment of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "including" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counter-clockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

A corner point in an image is an important feature characterizing the image. Since image corner point detection is an important part of processes such as automatic detection of workpieces in an industrial site, the corner point extraction capability and speed thereof may directly affect the precision and efficiency of industrial automation detection. Existing corner point detection algorithms may be approximately categorized into a model-based method, a grayscale-based method, and a contour-based method. The algorithm of extracting corner points on a contour curve is widely used in industrial detection sites due to its small computation amount and high detection accuracy. An existing method includes first extracting candidate corner points on a contour, and then determining, based on angles formed by lines connecting three corner points, whether a middle corner point is a true corner point. However, in this method, the number of traversals is large, which may lead to high algorithm complexity. As a result, the efficiency of corner point detection is impacted. In addition, at present, during detection on a corner point of a target object, since a workpiece in an image may include a plurality of objects, and the plurality of objects may overlap each other, the corner point of the target object is more difficult to be detected or located.

In view of this, an embodiment of the present application provides a corner point detection method, in which corner points on a contour of a target object are first obtained, a region proportion corresponding to each corner point is then calculated, where the region proportion is a proportion of a region other than a background in a predetermined region centered on a current corner point, and whether the corner point is a target corner point is determined based on a relationship between the region proportion and a predetermined value. In the corner point detection method according to the present application, to determine whether a current corner point is a target corner point, what is only needed is to compare a region proportion of the current corner point with a predetermined value, and no other corner points are required for assisting in the determining. Compared with the existing methods, the method of the present application reduces the number of traversals and the algorithm complexity, and improves the efficiency of corner point detection.

FIG. 1 shows a corner point detection method 100 according to an embodiment of the present application. The method 100 specifically includes the following steps 110 to 130.

In 110, a plurality of corner points of a target object in an image to be detected are obtained. The plurality of corner points are corner points on a contour of a first object in the image to be detected, and the contour of the first object includes a contour of the target object.

The image to be detected may be, for example, an image of the target object captured by a camera, for detection of the corner points of the target object. In a detection scenario of a workpiece, the target object may be either the entire workpiece, or a component on the workpiece.

Figure 2:
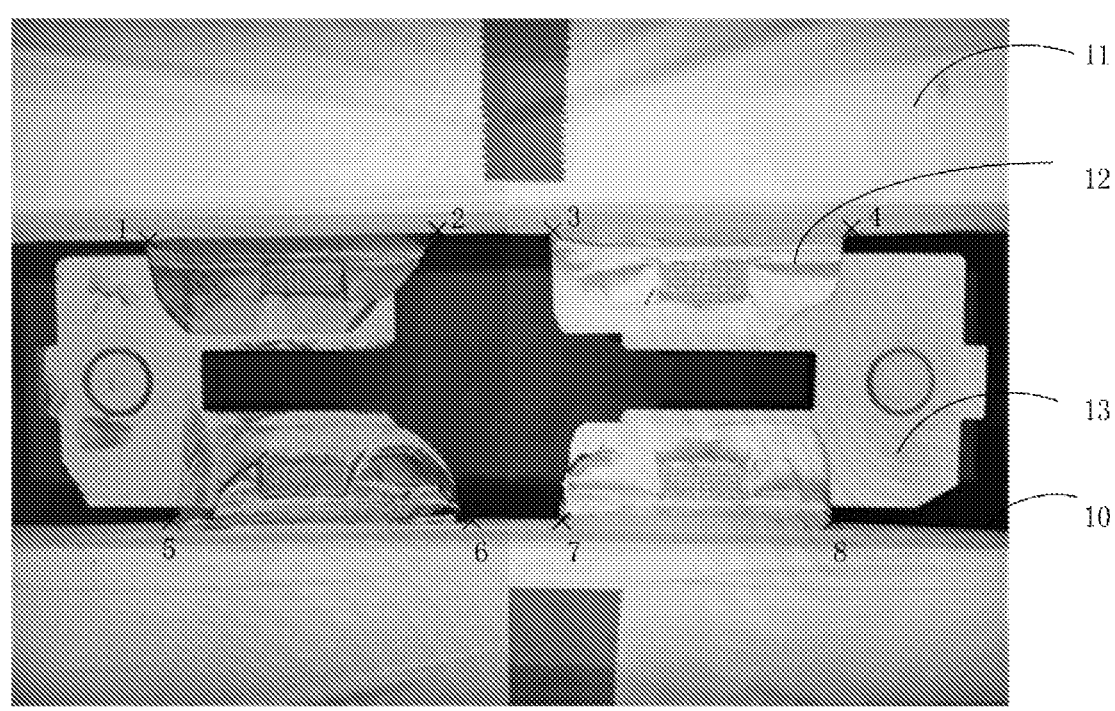
FIG. 2 is a schematic diagram of an image to be detected according to an embodiment of the present application.

It should be noted that when the target object is a component on the workpiece, the image to be detected of the workpiece that is captured by the camera not only includes the target object, but may also include another object. In the present application, all objects in the image to be detected are referred to as a first object, and the target object may either be separate from or overlap the another object. The overlapping may be either complete overlapping or partial overlapping. For example, an image to be detected as shown in FIG. 2 is an image of an electrode assembly captured by a camera. The image includes a background 10, a cell body 11, tabs 12, and an adapter plate 13, where the first object is the electrode assembly, including the three objects, namely, the cell body 11, the tabs 12, and the adapter plate 13. When the target object is the tab 12, it can be seen therefrom that the target object, that is, the tab 12 is welded on the another object, i.e., the adapter plate 13, and the two overlaps each other.

When the target object is a component on the workpiece, there may be one or more the target objects in the image to be detected (for example, there are four tabs in FIG. 2), which is not limited in the present application.

The image to be detected has the first object and the environmental background therein, and the first object includes the target object. Determining locations of corner points on a contour curve of the target object may quickly locate the target object, and thus quickly complete subsequent analysis of the target object.

The contour of the first object refers to a line forming the outer edge of the first object when the first object is separated from the background. The contour of the target object refers to a line forming the outer edge of the target object when the target object is separated from the background. If the target object and the another object partially overlap each other, the contour of the first object includes the contour of the target object, and a corner point on the contour of the target object is located on the contour of the first object.

In step 120, a region proportion corresponding to each of the plurality of corner points is obtained. The region proportion is a proportion of a region of the first object in a predetermined region centered on the corner point.

After the plurality of corner points of the target object are obtained, all the corner points are traversed and the region proportion corresponding to each corner point is calculated. The region proportion is a calculated proportion of a region of the first object in a predetermined region drawn with a corner point currently traversed as the center.

In step 130, a target corner point of the target object is determined from the plurality of corner points based on the region proportion.

If the target object and the another object partially overlap each other, the target corner point is a corner point at which the target object is adjacent to the background in the image to be detected. As shown in FIG. 2, corner points 1 to 8 are target corner points of the tabs 12. After the plurality of corner points are obtained, interference points may be excluded from the plurality of corner points based on their region proportions, thereby determining the target corner point of the target object.

In the corner point detection method according to this embodiment of the present application, whether a corner point is a target corner point may be determined based only on the region proportion, and no other corner points are required for assisting in the determining. Compared with the existing methods, the method of the present application reduces the number of traversals and the algorithm complexity, and improves the efficiency of corner point detection.

Optionally, in some embodiments, step 130 may be obtaining at least one candidate corner point whose region proportion being greater than a predetermined value from the plurality of corner points, and then obtaining the target corner point from the at least one candidate corner point.

It should be understood that in the embodiment described above, first, each of the plurality of region proportions is compared with the predetermined value, and when a region proportion is greater than the predetermined value, a corner point corresponding to the region proportion is listed as a candidate corner point. After all the corner points are traversed, there may be one or more candidate corner points. If there is only one candidate corner point, this candidate corner point is the target corner point; or if there are a plurality of candidate corner points, one candidate corner point needs to be determined from the plurality of candidate corner points as the target corner point.

It should be noted that it is also possible to compare the region proportion with a predetermined range, and if a region proportion is within the predetermined range, a corner point corresponding to the region proportion may be listed as a candidate corner point.

Interference points are filtered out in a numerical comparison manner of comparing the region proportion with the predetermined value, to obtain the qualified candidate corner points, which is conducive to determining the target corner point as fast as possible. Therefore, the efficiency of corner point detection is improved.

Optionally, in some embodiments, obtaining the target corner point from the at least one candidate corner point may include: if there are a plurality of candidate corner points, determining the target corner point based on a location relationship between each of the plurality of candidate corner points and a center point of the target object.

The location relationship may include a distance relationship, an orientation relationship, or both between the candidate corner point and the center point of the target object. Since the location relationship between each of the plurality of candidate corner points and the center point of the target object varies, the target corner point may be determined from the plurality of candidate corner points by setting a location relationship. As an example, either a candidate corner point at a maximum distance from the center point of the target object, or a candidate corner point in a specific orientation of the center point of the target object may be selected as the target corner point.

In the embodiment described above, since the location relationship between each candidate corner point and the center point of the target object varies, the target corner point may be determined from the plurality of candidate corner points based on the location relationship in one step. Therefore, the efficiency of corner point detection is improved.

Optionally, in some embodiments, determining the target corner point based on a location relationship between each of the plurality of candidate corner points and a center point of the target object may be determining, as the target corner point, a candidate corner point of the plurality of candidate corner points that is at a maximum vertical distance from a location of the center point of the target object.

Optionally, in some embodiments, obtaining a plurality of corner points of a target object in an image to be detected in step 110 may include: obtaining the plurality of corner points in a region of interest in the image to be detected.

The region of interest (ROI) may be an artificially set region, a size and location of which may be set in advance. For example, a region to be processed may be outlined using a shape such as a rectangle, a circle, an ellipse, or an irregular polygon. In an image to be detected that is captured each time at a visual detection station, a location region of the target object in the image to be detected is relatively fixed. Therefore, a region of interest may be set in the image to be detected, in order to reduce a range of the image to be detected that requires analysis and processing. For example, the number of corner points to be obtained for subsequent processing may be reduced, so that the number of traversals and the amount of computation may be reduced, and thus the efficiency of corner point detection may be improved.

Optionally, in some embodiments, at least one region of interest may be determined in the image to be detected.

In other words, in the image to be detected, a plurality of regions of interest may be set so as to obtain corner points. If the number of corner points on the contour of the first object is large, the number of corner points to be obtained may be further reduced by setting a plurality of regions of interest, to further reduce the number of traversals and the amount of computation, and thus improve the efficiency of corner point detection.

It should be noted that, in this embodiment of the present application, a target corner point of a target object is obtained in the case that a location of the target object in an image to be detected is known, and therefore, an approximate location of the target corner point is determined. In this case, corner points needed to be analyzed may be reduced by using the region of interest. In this embodiment of the present application, the number of regions of interest is the same as that of target corner points, and only one target corner point needs to be determined in each region of interest.

Optionally, in some embodiments, obtaining a plurality of corner points of a target object in an image to be detected in step 110 may include: obtaining the contour of the first object in the region of interest to obtain a target contour, where the target contour includes the contour of the target object; and obtaining corner points on the target contour to obtain the plurality of corner points.

The image to be detected may include one or more regions of interest. The contour of the first object not only includes the contour of the target object, but may also include a contour of the another object. The contour of the target object is cut out of the contour of the first object by using the region of interest, to obtain the contour including the target object, and the corner points on the contour including the target object are obtained, which reduces the number of corner points to be obtained, and thus improves the efficiency of corner point detection, compared to first obtaining all corner points on the contour of the first object and then obtaining corner points on the contour including the target object by using the region of interest.

Optionally, in some embodiments, a polygon corresponding to the target contour may be obtained by using a polygon approximation method, and vertices of the polygon may be obtained to obtain the plurality of corner points.

When a shape analysis is performed on a contour, a polygon is often used to approximate the contour, to reduce the number of vertices. This may be implemented by a common approxPolyDP function in OpenCV. Other methods may be used to obtain the polygon corresponding to the target contour, which is not limited in the present application. Since the approxPolyDP function in OpenCV is a common polygon approximation method in the prior art, details are not described herein again.

Obtaining the polygon corresponding to the target contour by using the polygon approximation method may reduce corner points that need to be subsequently processed, and thus improve the efficiency of corner point detection.

Optionally, in some embodiments, before obtaining the contour of the first object in the region of interest, the method 100 may further include: performing binarization on the image to be detected, to obtain a binary image of the image to be detected, and obtaining the contour of the first object based on an edge of the binary image.

A corresponding binarization method, such as general binarization, Otsu's binarization, local binarization, and adaptive binarization, may be selected based on a luminance relationship between the foreground (the first object or the workpiece) and the environmental background. In this way, values of foreground pixels may be set to be 1, and values of background pixels may be set to be 0; or values of foreground pixels may be set to be 0, and values of background pixels may be set to be 1.

By means of analyzing the edge of the binary image, an edge of the first object will appear in the binary image, and thus, the edge of the first object may form a contour curve of the first object.

Depending on the number and shapes of objects in the first object, there may be one or more contour curves of the first object.

In the embodiment described above, after the binarization processing is performed on the image to be detected, the image may appear in distinctly black and white, so that the contour of the first object is highlighted, and then may be quickly extracted from the edge of the binary image.

Optionally, in some embodiments, before the contour of the first object is obtained based on the edge of the binary image, denoising processing may be performed on the binary image.

A contour edge of an object in the image obtained after the binarization processing is rough, or uneven. For example, a median filtering method may be used to perform denoising processing on the binary image. The median filtering method is a non-linear smoothing technique, which sets a grayscale value of each pixel to be a median of grayscale values of all pixels within a neighborhood window of the pixel such that neighboring pixel values approximate their true values, thereby eliminating isolated pixel points. Specifically, the method may employ a two-dimensional sliding template of a specific structure, sort pixels within the template by pixel size, to generate a monotonically increasing (or decreasing) two-dimensional data sequence. The two-dimensional template is typically a 3×3 region or 5×5 region, or may be of a different shape, such as linear, circular, cross-shaped, ring-shaped. The median filtering method is a denoising method commonly used in the prior art, and details are not described herein again. Of course, other denoising methods may be employed.

Optionally, in some embodiments, the predetermined region may be in the shape of a circle. Setting the predetermined region to be in the shape of a circle facilitates quick determining of the region proportion of the region of the first object in the predetermined region. In addition, there is no need to consider an impact of angles on the region proportion, which needs to be considered for other angled images. Therefore, the accuracy of corner point detection is improved.

Optionally, in some embodiments, a radius of the circle may be ten pixels. Setting the radius of the circular predetermined region to be ten pixels may avoid the problem that if the radius is excessively large, other corner points may be included in the predetermined region, which affects calculation of a region proportion of a current corner point; or if the radius is excessively small, the precision will be relatively low. Setting the value may help calculate the region proportion more properly and effectively, so as to improve the accuracy of the corner point detection.

Optionally, in some embodiments, the predetermined value may be 0.6. Setting the predetermined value to be 0.6 may exclude corner points on an approximate line, which facilitates quick obtaining of the target corner point, thereby improving the efficiency of corner point detection.

Optionally, in some embodiments, the target object may be a tab. For a process of detecting a target corner point of a tab, reference may be made to the following description in conjunction with FIG. 3 and FIG. 4.

Figure 3:
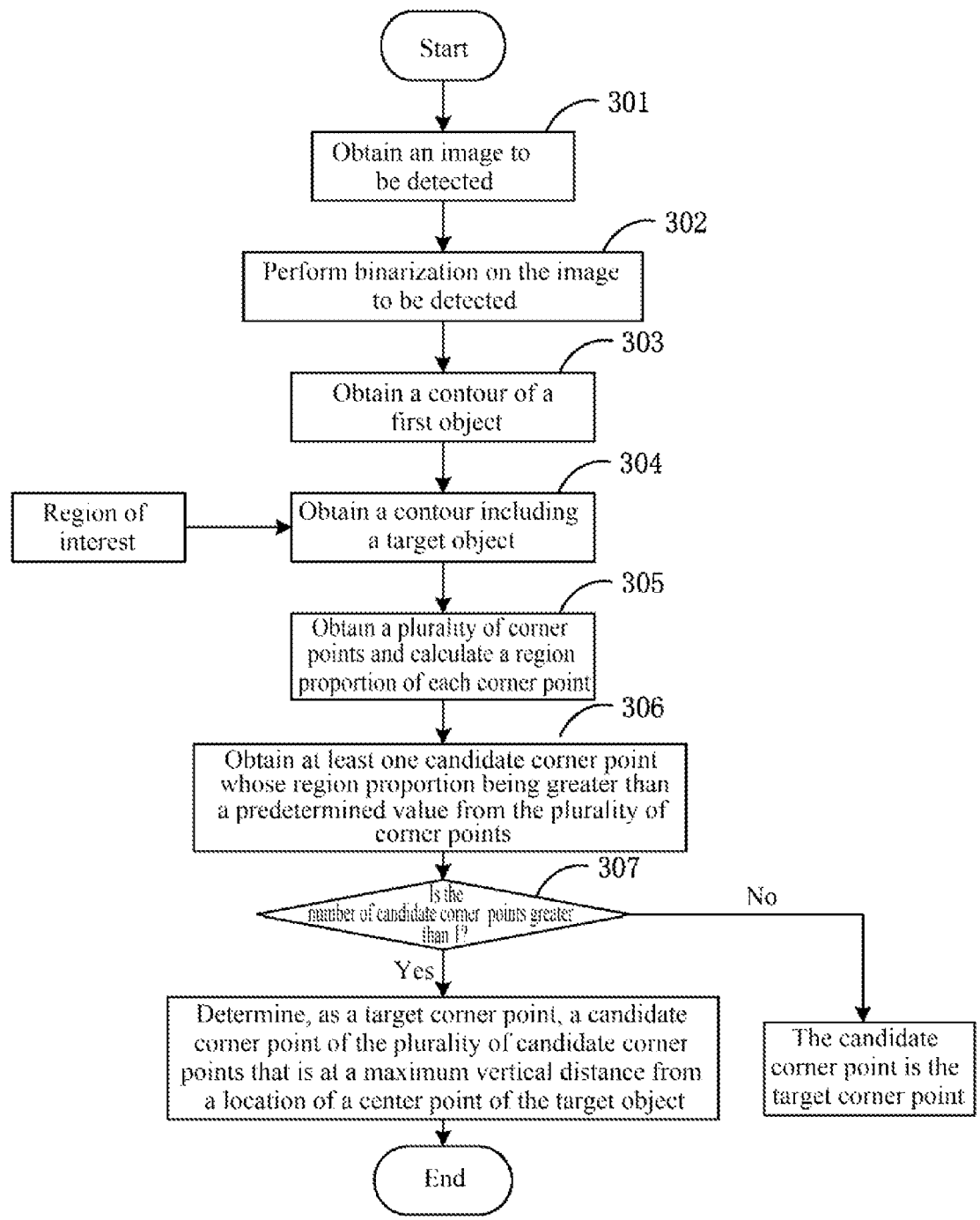
FIG. 3 is a schematic flowchart of another corner point detection method according to an embodiment of the present application.
Figure 4:
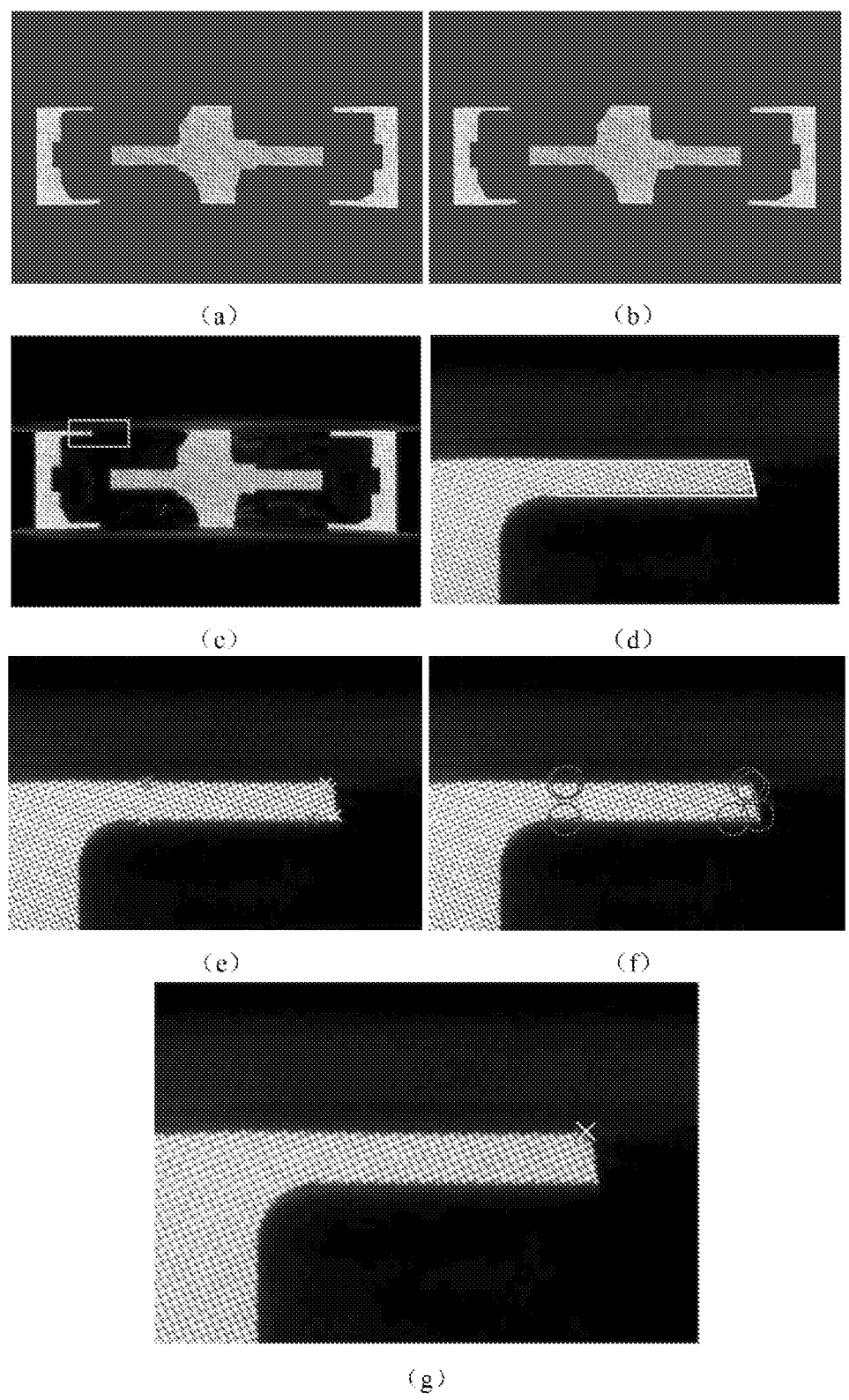
FIG. 4 is a schematic diagram of a process of another corner point detection method according to an embodiment of the present application.

According to some embodiments of the present application, with reference to FIG. 3 and FIG. 4, the present application provides a schematic flowchart of a corner point detection method 300 for a tab. The process 300 may include at least a part of the following content. FIG. 4 is a schematic diagram of a process of detecting a target corner point of a tab.

In step 301, an image to be detected is obtained. As shown in FIG. 2, during detection on a corner point of a tab 12 on the electrode assembly, a captured image to be detected includes, in addition to the tab 12, the cell body 11, and the adapter plate 13, where the tab 12 is welded on the adapter plate 13.

In step 302, binarization is performed on the image to be detected. FIG. 4(a) is an image obtained after the binarization processing is performed on the image in FIG. 2, in which a black portion is the electrode assembly, including the cell body 11, the tab 12, and the adapter plate 13; and a white portion is the background.

In step 303, a contour of a first object is obtained. By means of performing binarization on an edge of the image, that is, an intersection of the black and white portions, the contour of the first object may be extracted. FIG. 4(b) shows a contour of the electrode assembly obtained by obtaining an edge of the electrode assembly in FIG. 4(a). The electrode assembly has three contour curves, which are edge curves of the three white regions, and the contour of the electrode assembly includes a part of contours of the tabs.

In step 304, a contour including a target object is obtained. Specifically, the contour including the target object is obtained by using a region of interest. In FIG. 4(c), a contour including the tab is cut out by using the region of interest denoted by a rectangular box to obtain a target contour. It should be noted that, FIG. 4(c) shows only one region of interest denoted by a rectangular box, but there are actually eight regions of interest denoted by rectangular boxes in total, and the other seven are not shown. One target corner point needs to be detected in each region of interest denoted by a rectangular box, and thus eight target corner points need to be detected for the tabs in this image.

In Step 305, a plurality of corner points are obtained and a region proportion of each corner point is calculated. Specifically, a polygon corresponding to the target contour is obtained by using a polygon approximation method, and vertices of the polygon are obtained to obtain the plurality of corner points. FIG. 4(e) shows the plurality of obtained corner points. To calculate the region proportion of each corner point, a proportion of a region of the first object in a predetermined region centered on the corner point may be calculated. FIG. 4(f) is a diagram showing region proportions of corner points in an example in which the predetermined region is in the shape of a circle.

In step 306, at least one candidate corner point whose region proportion being greater than a predetermined value is obtained from the plurality of corner points. Whether the region proportion corresponding to each corner point is greater than the predetermined value, and if yes, the corner point is listed as a candidate corner point.

In step 307, whether there are a plurality of candidate corner points is determined. If not, it indicates that all interference points have been excluded based on the predetermined value and the region proportion, and the one listed candidate corner point is the target corner point; or if yes, it indicates that not all interference points have been excluded based on the predetermined value and the region proportion, and then, a candidate corner point of the plurality of candidate corner points that is at a maximum vertical distance from a location of the center point of the target object is determined as the target corner point. When the predetermined value is 0.6, the final detected target corner point of the tab is shown in FIG. 4(g).

It should also be noted that, only one region of interest is described above as an example, target corner points in the other seven regions of interest may be detected according to steps following step 304.

The method embodiments of the embodiments of the present application are described in detail above, and the apparatus embodiments of the embodiments of the present application are described below. The apparatus embodiments correspond to the method embodiments. Therefore, for the parts that are not described in detail, refer to the above method embodiments. The apparatus may implement any possible implementation in the above methods.

Figure 5:
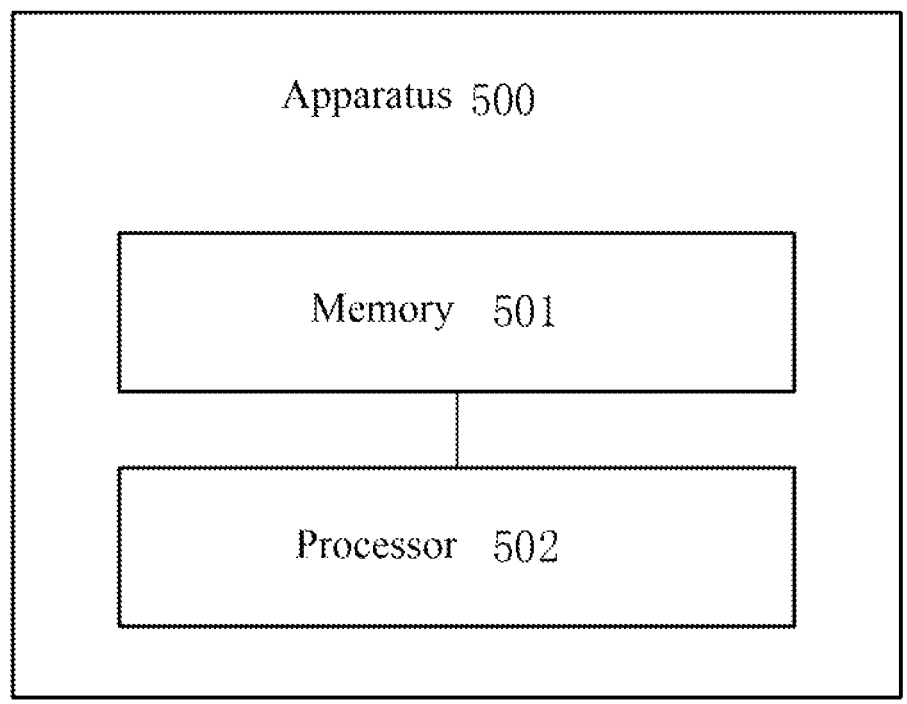
FIG. 5 is a schematic diagram of a structure of a corner point detection apparatus according to an embodiment of the present application.

FIG. 5 is a schematic diagram of a hardware structure of a corner point detection apparatus according to an embodiment of the present application. The corner point detection apparatus 500 shown in FIG. 5 includes a memory 501 and a processor 502, where the memory 501 stores instructions that, when executed by the processor, cause the apparatus 500 to perform the method according to any one of the embodiments described above.

The memory 501 may be a read-only memory (ROM), a static storage device, and a random access memory (RAM).

The processor 502 may be a general-purpose central processing unit (CPU), a microprocessor, an application-specific integrated circuit (ASIC), a graphics processing unit (GPU), or one or more integrated circuits, to execute related programs to implement functions required to be performed by units in the corner point detection apparatus in the embodiments of the present application, or perform the corner point detection method in the embodiments of the present application.

The processor 502 may also be an integrated circuit chip having a signal processing capability. In an implementation process, the steps of the corner point detection method in the embodiments of the present application may be implemented by using a hardware integrated logic circuit in the processor 502, or by using instructions in the form of software.

The processor 502 may also be a general-purpose processor, a digital signal processor (DSP), an ASIC, a field-programmable gate array (FPGA) or another programmable logic device, a discrete gate or transistor logic device, or a discrete hardware component. Various methods, steps, and logical block diagrams disclosed in the embodiments of the present application may be implemented or executed. The general-purpose processor may be a microprocessor, or the processor may be any conventional processor, etc. The steps of the methods disclosed with reference to the embodiments of the present application may be directly presented as being performed and completed by a hardware processor, or performed and completed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 501, and the processor 502 reads the information in the memory 501, and completes, in combination with its hardware, functions required to be performed by units included in the corner point detection apparatus in the embodiments of the present application, or perform the corner point detection method in the embodiments of the present application.

An embodiment of the present application further provides a computer-readable storage medium, which stores program code executable by a device, and the program code includes instructions for performing the steps in the above corner point detection method.

An embodiment of the present application further provides a computer program product. The computer program product includes a computer program stored on a computer-readable storage medium. The computer program includes program instructions that, when executed by a computer, cause the computer to perform the above corner point detection method.

The above computer-readable storage medium may be a transitory computer-readable storage medium or a non-transitory computer-readable storage medium.

A person skilled in the art can clearly understand that, for the convenience and brevity of the description, references can be made to the corresponding process in the above method embodiment for the specific working process of the apparatus described above, and details are not described herein again.

In the several embodiments provided in the present application, it should be understood that the disclosed apparatus and method can be achieved by other methods. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The wording used in the present application is only used to describe the embodiments, and is not used to limit the claims. As used in the description of the embodiments and the claims, the singular forms "a", "an", and "the" are also intended to include the plural forms, unless otherwise clearly indicated in the context. Similarly, as used in the present application, the term "and/or" refers to any of or all of possible combinations of one or more associated listed items. Additionally, when used in the present application, the term "comprising" refers to the presence of described features, entities, steps, operations, elements, and/or components, but do not exclude the presence or addition of one or more other features, entities, steps, operations, elements, components, and/or a combination thereof.

The aspects, embodiments, implementations, or features in the described embodiments can be used alone or in any combination. The aspects in the described embodiments can be implemented by software, hardware, or a combination thereof. The described embodiments may also be embodied by a computer-readable medium storing computer-readable code, and the computer-readable code includes instructions executable by at least one computing apparatus. The computer-readable medium may be associated with any data storage apparatus that can store data, and the data can be accessed by a computer system. For example, the computer-readable medium may include a read-only memory, a random access memory, a compact disc read-only memory (CD-ROM), a hard disk drive (HDD), a digital video disc (DVD), a magnetic tape, an optical data storage apparatus, etc. The computer-readable medium may also be distributed in a computer system connected through a network, so that the computer-readable code can be stored and executed in a distributed manner.

With regard to the above technical description, reference may be made to the accompanying drawings, which form a part of the present application and show, through the description, the implementations according to the described embodiments. Although these embodiments are described in sufficient detail to enable those skilled in the art to implement these embodiments, these embodiments are not limiting. Thus, other embodiments may be used, and changes may also be made without departing from the scope of the described embodiments. For example, the sequence of operations described in the flowchart is not limiting, and therefore, the sequence of two or more operations set forth in the flowchart and described according to the flowchart can be changed according to several embodiments. As another example, in several embodiments, one or more operations set forth in the flowchart and described according to the flowchart are optional or deletable. Additionally, some steps or functions may be added to the disclosed embodiments, or the sequence of two or more steps may be reversed. All these changes are considered to be included in the disclosed embodiments and claims.

Additionally, terms are used in the above technical description to provide a thorough understanding of the described embodiments. However, excessive details are not required to implement the described embodiments. Therefore, the above description of the embodiments is presented for explanation and description. The embodiments presented in the above description and the examples disclosed according to these embodiments are provided separately to add context and help understand the described embodiments. The specification above is not intended to be exhaustive or to limit the described embodiments to the precise form of the present application. According to the above teaching, modifications, selective applications, and changes are possible. In some cases, well-known processing steps are not described in detail to avoid unnecessarily affecting the described embodiments. While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A processor implemented corner point detection method, comprising:
    obtaining a plurality of corner points of a target object in an image to be processed, wherein the plurality of corner points are corner points on a contour of a first object in the image to be processed, and the contour of the first object comprises a contour of the target object;
    wherein the obtaining a plurality of corner points of a target object in an image to be processed comprises: obtaining the plurality of corner points in a region of interest in the image to be processed;
    obtaining a region proportion for each of the plurality of corner points, wherein the region proportion is a proportion of a region of the first object in a predetermined region of the image to be processed, centered on the corner point; and
    determining a target corner point of the target object from the plurality of corner points based on the region proportion;
    wherein the determining a target corner point of the target object from the plurality of corner points based on the region proportion comprises:
    obtaining at least one candidate corner point whose region proportion is greater than a predetermined value from the plurality of corner points; and
    obtaining the target corner point from the at least one candidate corner point;
    wherein the obtaining the target corner point from the at least one candidate corner point comprises:
    determining there are a plurality of candidate corner points, and subsequently determining the target corner point based on a location relationship between each of the plurality of candidate corner points and a center point of the target object.

2. The method according to claim 1, wherein the determining the target corner point based on a location relationship between each of the plurality of candidate corner points and a center point of the target object comprises: determining, as the target corner point, a candidate corner point of the plurality of candidate corner points that is at a maximum vertical distance from a location of the center point of the target object.

3. The method according to claim 1, further comprising:
   determining at least one region of interest in the image to be processed.

4. The method according to claim 1, wherein the obtaining a plurality of corner points of a target object in an image to be processed comprises: obtaining the contour of the first object in the region of interest to obtain a target contour, wherein the target contour comprises the contour of the target object;
   and obtaining corner points on the target contour to obtain the plurality of corner points.

5. The method according to claim 4, wherein the obtaining corner points on the target contour to obtain the plurality of corner points comprises:
   obtaining a polygon corresponding to the target contour by using a polygon approximation method; and
   obtaining vertices of the polygon to obtain the plurality of corner points.

6. The method according to claim 4, wherein before obtaining the contour of the first object in the region of interest, the method further comprises: performing binarization on the image to be processed, to obtain a binary image of the image to be processed; and obtaining the contour of the first object based on an edge of the binary image.

7. The method according to claim 1, wherein the predetermined region is in the shape of a circle.

8. The method according to claim 7, wherein a radius of the circle is ten pixels.

9. The method according to claim 1, wherein the predetermined value is 0.6.

10. The method according to claim 1, wherein the target object is a tab.

11. A corner point detection apparatus, comprising a processor and a memory, wherein the memory is configured to store a program, and the processor is configured to invoke the program from the memory and execute the program to perform a corner point detection method according to claim 1.

12. A non-transitory computer-readable storage medium, comprising a computer program that, when executed on a computer, causes the computer to perform a corner point detection method according to claim 1.

* * * * *